United States Patent
Fischl

(10) Patent No.: US 9,863,492 B2
(45) Date of Patent: Jan. 9, 2018

(54) BRAKE LINING MOUNTING FOR A DISC BRAKE

(71) Applicant: KNORR-BREMSE Systeme fuer Nutzfahrzeuge GmbH, Munich (DE)

(72) Inventor: Tobias Fischl, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 30 days.

(21) Appl. No.: 14/938,263

(22) Filed: Nov. 11, 2015

(65) Prior Publication Data

US 2016/0061278 A1    Mar. 3, 2016

Related U.S. Application Data

(63) Continuation of application No. PCT/EP2014/059564, filed on May 9, 2014.

(30) Foreign Application Priority Data

May 13, 2013 (DE) .................... 10 2013 008 226

(51) Int. Cl.
*F16D 65/00* (2006.01)
*F16D 65/097* (2006.01)
(Continued)

(52) U.S. Cl.
CPC ....... *F16D 65/0068* (2013.01); *F16D 55/225* (2013.01); *F16D 65/0006* (2013.01); *F16D 65/092* (2013.01); *F16D 65/095* (2013.01); *F16D 65/0974* (2013.01); *F16D 65/0977* (2013.01); *F16D 65/0978* (2013.01); *F16D 2055/007* (2013.01); *F16D 2250/0084* (2013.01)

(58) Field of Classification Search
CPC .. F16D 65/0068; F16D 65/006; F16D 65/095; F16D 65/0974; F16D 65/0975; F16D 65/0977; F16D 65/0978
USPC ......... 188/73.31, 73.32, 73.38, 73.37, 250 B
See application file for complete search history.

(56) References Cited

U.S. PATENT DOCUMENTS

| 3,899,052 A | 8/1975 | Burnett et al. |
| 4,993,520 A * | 2/1991 | Goddard ............... F16D 65/092 188/250 B |

(Continued)

FOREIGN PATENT DOCUMENTS

| DE | 25 20 768 A1 | 12/1975 |
| DE | 40 20 287 A1 | 1/1992 |

(Continued)

OTHER PUBLICATIONS

International Search Report (PCT/ISA/210) issued in PCT Application No. PCT/EP2014/059564 dated Jul. 28, 2014 with English translation (Four (4) pages).

(Continued)

*Primary Examiner* — Melanie Torres Williams
(74) *Attorney, Agent, or Firm* — Crowell & Moring LLP

(57) ABSTRACT

A brake lining mounting for a disk brake for a commercial vehicle includes a lining holder and lining holding springs. The lining holder is supported on lining holding springs of brake linings which are arranged in a brake caliper on both sides of a brake disk. The lining holder spans a mounting opening of the brake caliper in an axial direction of the brake disk. The lining holder consists of one or more cables.

20 Claims, 3 Drawing Sheets

(51) Int. Cl.
*F16D 65/095* (2006.01)
*F16D 55/225* (2006.01)
*F16D 65/092* (2006.01)
F16D 55/00 (2006.01)

(56) References Cited

U.S. PATENT DOCUMENTS

| | | | |
|---|---|---|---|
| 5,875,873 A | 3/1999 | Kay et al. | |
| 6,302,243 B1 * | 10/2001 | Ruiz | F16D 55/228 |
| | | | 188/73.1 |
| 8,151,951 B2 * | 4/2012 | Cornolti | F16D 55/228 |
| | | | 188/250 B |
| 2010/0230220 A1 | 9/2010 | Keller et al. | |
| 2010/0276232 A1 * | 11/2010 | Keller | F16D 65/0977 |
| | | | 188/73.31 |
| 2015/0192180 A1 * | 7/2015 | Kloos | F16D 65/092 |
| | | | 188/73.31 |

FOREIGN PATENT DOCUMENTS

| | | |
|---|---|---|
| DE | 698 16 175 T2 | 4/2004 |
| DE | 10 2006 023 964 B3 | 8/2007 |
| DE | 10 2008 027 052 A1 | 12/2009 |
| EP | 0 534 987 B1 | 8/1994 |
| EP | 0 877 176 A2 | 11/1998 |

OTHER PUBLICATIONS

International Preliminary Report on Patentability (PCT/IB/326 & PCT/IB/373) issued in PCT Application No. PCT/EP2014/059565, including English translation of Written Opinion (PCT/ISA/237) dated Nov. 26, 2015 (six (6) pages).

* cited by examiner

BRAKE LINING MOUNTING FOR A DISC BRAKE

CROSS REFERENCE TO RELATED APPLICATIONS

This application is a continuation of PCT International Application No. PCT/EP2014/059564, filed May 9, 2014, which claims priority under 35 U.S.C. §119 from German Patent Application No. 10 2013 008 226.9, filed May 13, 2013, the entire disclosures of which are herein expressly incorporated by reference.

BACKGROUND AND SUMMARY OF THE INVENTION

Embodiments of the present invention relate to a brake lining mounting for a disk brake.

DE 40 20 287 A1 discloses a brake lining mounting of the generic type which has proven itself, in particular, even under the frequently rough operating conditions which disk brakes are subjected to in commercial vehicles.

In order to secure the position of the two brake linings, they are provided in each case with a lining holding spring, which lining holding springs are fastened to the respective brake lining in the upper edge region which faces a mounting opening of the brake caliper. The brake linings are pressed under prestress into the lining shaft of a stationary brake carrier or of a brake caliper by a lining holding bracket which extends transversely with respect thereto. That is to say in the axial direction of the brake disk, and is supported on the lining holding springs. Here, the lining holding bracket is fixed in two regions of the brake caliper which lie opposite one another and delimit the mounting opening.

Mounting the brake linings under spring stress serves both for tolerance compensation and for a reduction or prevention of the production of rattling noise, as would otherwise occur during driving operation of the vehicle.

Existing lining holders in the form of said lining holding bracket are configured as a sheet metal part, with a substantially rectangular cross section, with the result that it bears with a planar underside against the lining holding springs.

Whereas one end of the lining holder is plugged into a pocket which is provided in the brake caliper, the other end is a fork-shaped or eyelet-shaped configuration with a plug-through opening which is penetrated by an integrally formed lug of the brake caliper, and with a transverse bore, in relation to the longitudinal extent of the lining holder, through which transverse bore a securing pin is guided which is supported on the lining holder. Here, the securing pin is secured against axial displacement by way of a plugged-on disk and/or a splint or the like.

The multiplicity of necessary individual parts, by way of which the lining holder is fastened to the brake caliper, but also the configuration of the pocket which receives the other end of the lining holder are possible only with relatively great outlay on production and assembly, the brake caliper consisting of cast iron and it being necessary for the pocket to be produced by way of corresponding casting technology measures.

The assembly outlay which is required to fasten the lining holder by means of the securing pin and associated securing parts leads to corresponding costs which by nature oppose the constant requirement for cost optimization. Apart from that, this likewise applies to the production of the brake caliper, as a result of the measures which are necessary for producing the pocket during casting.

The embodiments of the present invention are based on the object of developing a brake lining mounting of the generic type in such a way that it can be produced and assembled in a simpler and less expensive way.

This object is achieved by way of a brake lining mounting having the features of claim 1.

The inventive lining holder is first of all distinguished by its extremely simple production, but also likewise by its simple assembly, the cable, preferably a steel cable, being shaped in the broadest sense to form a loop, the free ends of which are held on a fastening element.

Said fastening element is connected, preferably screwed, to the brake caliper, a threaded bore being provided for this purpose in the brake caliper, into which threaded bore the screw can be screwed.

Moreover, the fastening element has a holder, preferably in the form of a disk, on which the free ends are held.

As previously, the lining holder is supported on the lining holding springs of the brake linings, the lining holder, that is to say the two cable sections which are formed and run in parallel bearing against the lining holding springs in a tautly tensioned manner in such a way that the latter are set under prestress, as a result of which the respective brake lining is pressed into a lining shaft of the brake caliper or a vehicle-side brake carrier.

In order to tension the cable sections, the holder which holds the cable ends can have a tensioning means, for example in the form of an eccentric cam which lies in a recess which is positioned in front of the threaded bore for the fastening screw and tensions the cable sections tautly when rotated.

Since both the fastening element and the lining holder in the form of the cable are already available as pre-manufactured parts, the assembly of the brake lining holder is substantially simpler than is possible in the prior art with the fastening parts which must be handled individually. This is associated with a corresponding cost reduction, to which the simpler production of the brake caliper also contributes, since the introduction of a pocket for receiving the lining holder can be dispensed with.

Instead, the integral formation of a base is sufficient, optionally with a groove, in which that region of the lining holder which lies opposite the fastening element lies.

In order to guide the two parallel cable sections, a bump which is provided with notches which are oriented in the longitudinal direction of the cable sections can be integrally formed in the caliper back, close to the fastening element.

The described shapes of the brake caliper can all be produced without substantial casting technology outlay, with the result that the invention contributes to cost-optimized production of the disk brake and assembly of the lining holder.

The simpler and less expensive production also relates to the manufacture of the lining holder itself, since the latter has up to now been formed from a stamped and reshaped sheet metal part, the material component of which is greater than the use of a cable. In addition, the cable merely has to be cut to length from a reel and provided with the fastening element, that is to say with the holder, which is possible far more easily than the production of the lining holder from sheet metal, plus the securing elements in the form of a securing pin and a splint or the like.

Further advantageous embodiments are characterized in the subclaims. Other objects, advantages and novel features of the present invention will become apparent from the following detailed description of one or more preferred embodiments when considered in conjunction with the accompanying drawings.

One exemplary embodiment of the invention will be described in the following text using the appended drawings, in which:

DETAILED DESCRIPTION OF EMBODIMENTS

Figure 1:
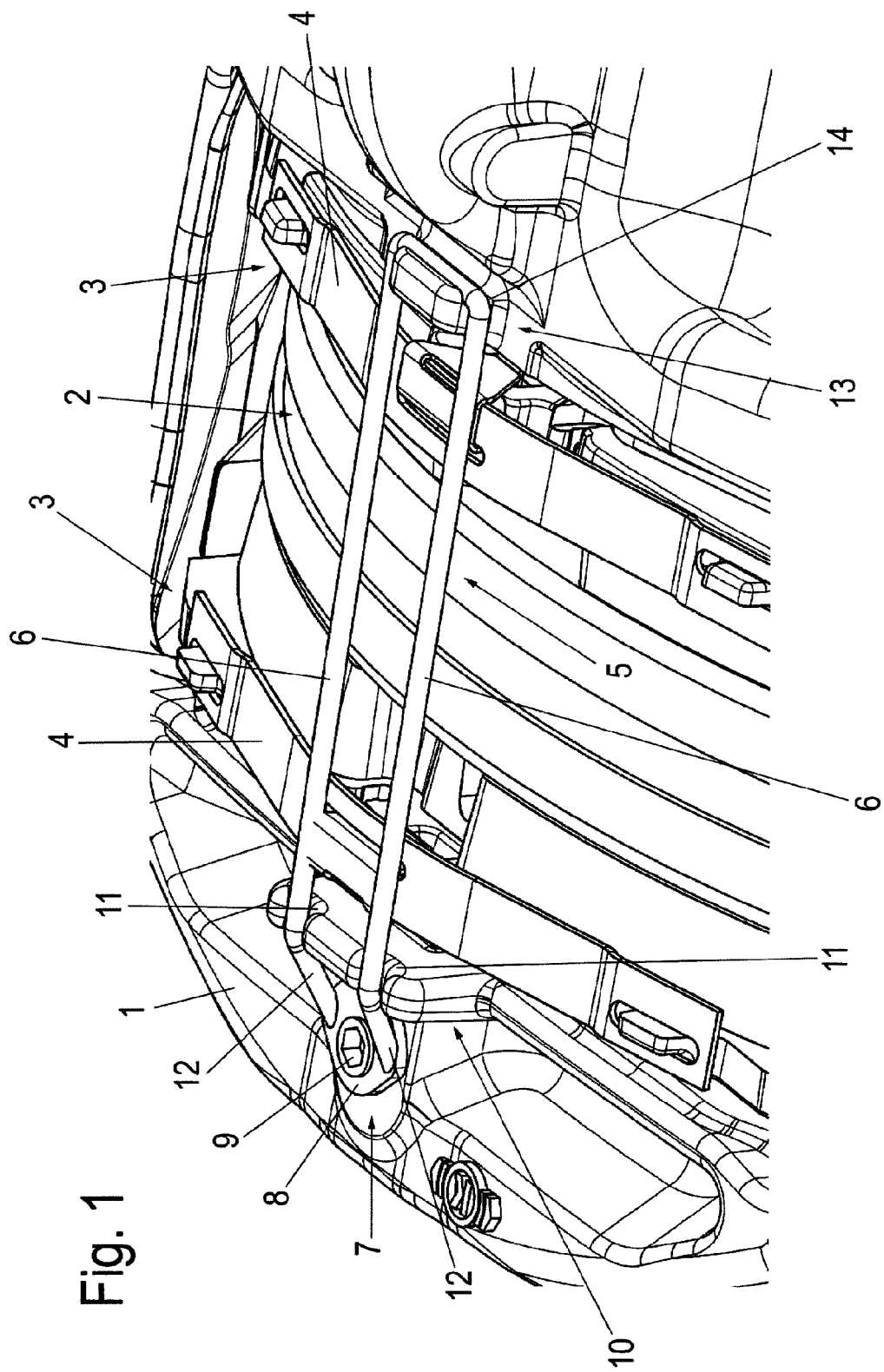
FIG. 1 shows a brake lining mounting in a disk brake which is shown as a part detail, in a perspective view, and FIGS. 2 and 3 in each case show a part detail of the brake lining mounting, likewise shown in perspective.

FIG. 1 shows a disk brake for a commercial vehicle, with a brake caliper 1, in which two brake linings 3 which are assigned on both sides of a brake disk 2 are positioned.

In each case spring-loaded by means of a lining holding spring 4, both brake linings 3 are held in a lining shaft of a stationary brake carrier (not shown) or in the brake caliper 1.

Here, the respective lining holding spring 4 extends transversely with respect to the axial direction of the brake disk 2 and is fastened to the brake lining 3 such that it can be deflected radially.

By means of a lining holder 5 which extends in the axial direction of the brake disk 2, spans a mounting opening of the brake caliper 1 and is supported on the lining holding springs 4, the latter are set under prestress, with the result that the brake linings 3 are pressed against the bottom of the lining shaft.

According to the embodiment, the lining holder 5 consists of a cable, which may be a steel cable, with two cable sections 6 which run parallel to and at a spacing from one another and bear against the lining holding springs 4. The lining holder 5 is guided in the manner of a loop and is fastened by way of two free end regions 12 in a holder 8 which is of disk-shaped configuration.

A screw 9 which is screwed into a threaded bore (not shown) of the brake caliper 1 is guided through the holder 8.

Figure 3:
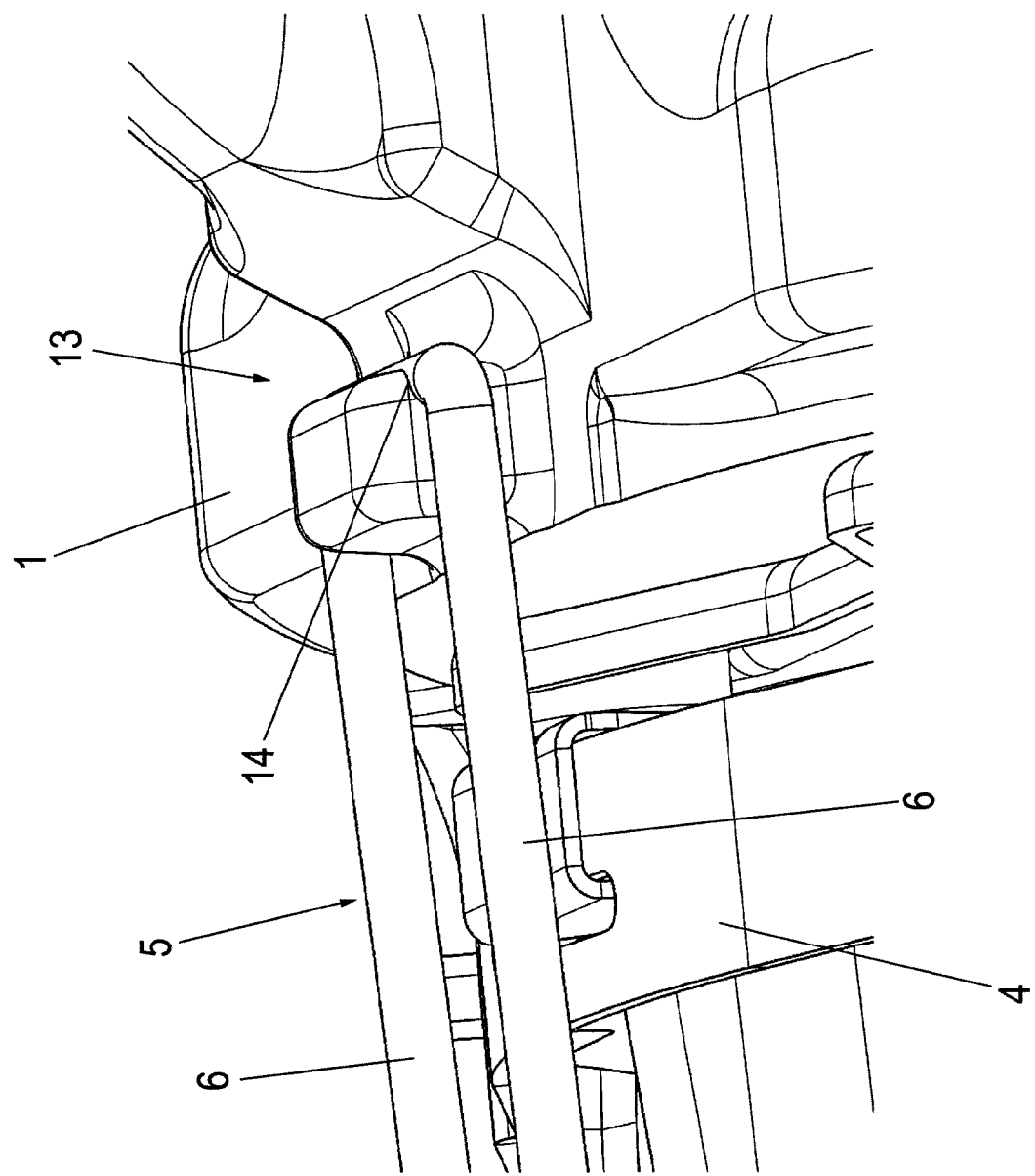

The opposite end of the lining holder 5 which forms a U-shaped course is held in a groove 14 of a base 13 which is formed integrally on the brake caliper 1, the groove 14 which can be seen clearly in the enlarged illustration in FIG. 3 extending transversely with respect to the axial direction of the brake disk 2. That is to say transversely with respect to the cable sections 6, and being made in the base 13 on the side which faces away from the associated brake lining 3.

Figure 2:
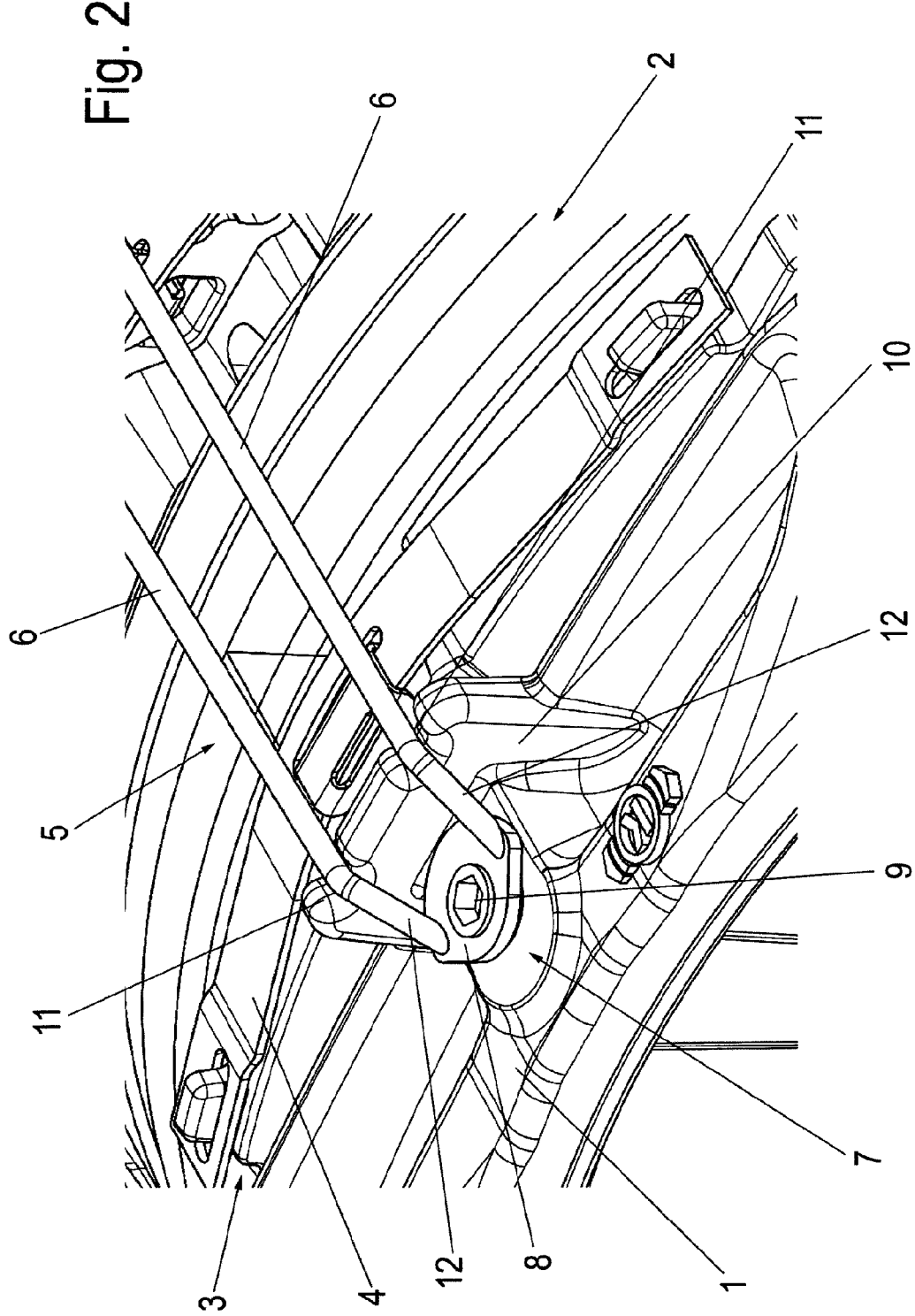

That end region of the lining holder 5 which lies opposite the base 13 is depicted as a detail in another perspective in FIG. 2; it can be seen that, adjacently to a fastening element 7, a constituent part of which is the holder 8, a bump 10 is formed integrally on the brake caliper 1, and is expediently made during casting just like the base 13 if the brake caliper 1 consists of cast iron.

On the upper side, the bump 10 has two notches 11 which are arranged at a spacing from one another, extend in the axial direction of the brake disk 2, and in which the cable sections 6 lie for guidance purposes.

The end regions 12 run in an inclined manner toward the brake caliper 1 in comparison with the connected cable sections 6, to which end the fastening element 7 is lower than the notches 11.

In order to tension the lining holder 5, in which the base 13 forms an abutment, an eccentric cam which cannot be seen since it lies on the concealed side is arranged on the holder 8, by way of which eccentric cam the cable sections 6 can be tensioned upon rotation, with the result that permanent prestress of the lining holding springs 4 is ensured.

LIST OF DESIGNATIONS

1 Brake caliper
2 Brake disk
3 Brake lining
4 Lining holding spring
5 Lining holder
6 Cable section
7 Fastening element
8 Holder
9 Screw
10 Bump
11 Notch
12 End region
13 Base
14 Groove The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake lining mounting for a disk brake for a commercial vehicle, comprising:
    a lining holder which is supported on lining holding springs of brake linings which are arranged in a brake caliper on both sides of a brake disk, the lining holder spanning a mounting opening of the brake caliper in an axial direction of the brake disk, wherein the lining holder consists of a cable.

2. The brake lining mounting as claimed in claim 1, wherein the lining holder has two cable sections which are arranged parallel to and at a spacing from one another and bear against the lining holding springs.

3. The brake lining mounting as claimed in claim 1, wherein the lining holder is formed from a steel cable.

4. The brake lining mounting as claimed in claim 1, wherein the lining holder or the course of the cable is U-shaped.

5. The brake lining mounting as claimed in claim 1, wherein free end regions are held on the brake caliper with a fastening element.

6. The brake lining mounting as claimed in claim 5, wherein the fastening element has a holder which receives end regions of the lining holder, in the form of a disk, and a screw which is guided through said holder and is screwed into a threaded bore of the brake caliper.

7. The brake lining mounting as claimed in claim 5, wherein the fastening element has a tensioning device that tensions the cable sections.

8. The brake lining mounting as claimed in claim 7, wherein the tensioning device includes an eccentric cam which lies in a receptacle of the brake caliper.

9. The brake lining mounting as claimed in claim 5, wherein a bump is formed integrally on the brake caliper in a manner which is assigned to the fastening element, on which bump the cable sections are supported.

10. The brake lining mounting as claimed in claim 9, wherein the bump has two notches which run in the longitudinal direction of the cable sections, are arranged at a spacing from one another, and in which in each case one cable section lies.

11. The brake lining mounting as claimed in claim 9, wherein a base is arranged on the brake caliper on the side which lies opposite the bump and delimits the mounting opening, around which base the lining holder is guided.

12. The brake lining mounting as claimed in claim 11, wherein on the side which faces away from the brake disk, the base has a groove which runs transversely with respect to the longitudinal extent of the cable sections and in which a part region of the lining holder lies.

13. A brake lining mounting for a disk brake of a commercial vehicle, comprising:
   a lining holder; and
   lining holding springs of brake linings which are arranged in a brake caliper on both sides of a brake disk, wherein
      the lining holding springs support the lining holder,
      the lining holder spans a mounting opening of the brake caliper in an axial direction of the brake disk,
      the lining holder has two steel cable sections which are arranged parallel to and at a spacing from one another and bear against the lining holding springs,
      the lining holder or the course of the two steel cables is U-shaped, and
      free end regions are held on the brake caliper with a fastening element.

14. The brake lining mounting as claimed in claim 13, wherein the fastening element has a holder which receives end regions of the lining holder, in the form of a disk, and a screw which is guided through said holder and is screwed into a threaded bore of the brake caliper.

15. The brake lining mounting as claimed in claim 14, wherein the fastening element has a tensioning device that tensions the two steel cable sections.

16. The brake lining mounting as claimed in claim 15, wherein the tensioning device includes an eccentric cam which lies in a receptacle of the brake caliper.

17. The brake lining mounting as claimed in claim 16, wherein a bump is formed integrally on the brake caliper in a manner which is assigned to the fastening element, on which bump the two steel cable sections are supported.

18. The brake lining mounting as claimed in claim 17, wherein the bump has two notches which run in the longitudinal direction of the two steel cable sections, are arranged at a spacing from one another, and in which in each case one cable section lies.

19. The brake lining mounting as claimed in claim 18, wherein a base is arranged on the brake caliper on the side which lies opposite the bump and delimits the mounting opening, around which base the lining holder is guided.

20. The brake lining mounting as claimed in claim 19, wherein on the side which faces away from the brake disk, the base has a groove which runs transversely with respect to the longitudinal extent of the two steel cable sections and in which a part region of the lining holder lies.

* * * * *